United States Patent [19]

Howes

[11] E Re. 29,984

[45] Reissued May 8, 1979

[54] ENGINE IGNITION AND POWER ANALYZER

[75] Inventor: Peter A. Howes, La Verne, Calif.

[73] Assignee: Clayton Manufacturing Company, El Monte, Calif.

[21] Appl. No.: 765,614

[22] Filed: Feb. 4, 1977

Related U.S. Patent Documents

Reissue of:

[64] Patent No.: 3,650,149
Issued: Mar. 21, 1972
Appl. No.: 792,382
Filed: Jan. 21, 1969

[51] Int. Cl.[2] ..... G01M 15/00

[52] U.S. Cl. ..... 73/117.3; 324/16 S; 324/16 T

[58] Field of Search ..... 73/116, 117.3; 324/19, 324/16 S, 16 T

[56] References Cited

U.S. PATENT DOCUMENTS

| | | | |
|---|---|---|---|
| 2,928,040 | 3/1960 | Welcome | 73/116 UX |
| 3,005,948 | 10/1961 | Broder et al. | 73/116 X |
| 3,400,579 | 9/1968 | Parmater et al. | 73/117.3 |
| 3,499,322 | 3/1970 | Pelta et al. | 73/116 |

*Primary Examiner*—Jerry W. Myracle
*Attorney, Agent, or Firm*—Jackson & Jones

[57] ABSTRACT

An internal combustion engine performance analyzing system is described for displaying a number of operating characteristics, such as engine ignition and cylinder power, which exists under selectively controlled operating conditions. Simple connections to the engine provide the necessary signals to the solid-state electronic analyzer. Various pattern display modes may be selected. An anticipatory cylinder fire signal, which is related to crankshaft rotational degrees, permits a given cylinder to be shorted for the desired interval, regardless of the engine speed. This anticipatory cylinder fire signal is obtained from a servoed ramp waveform generator. Individual cylinder waveform patterns are synchronously and simultaneously displayed on an oscilloscope.

48 Claims, 9 Drawing Figures

FIG. 4
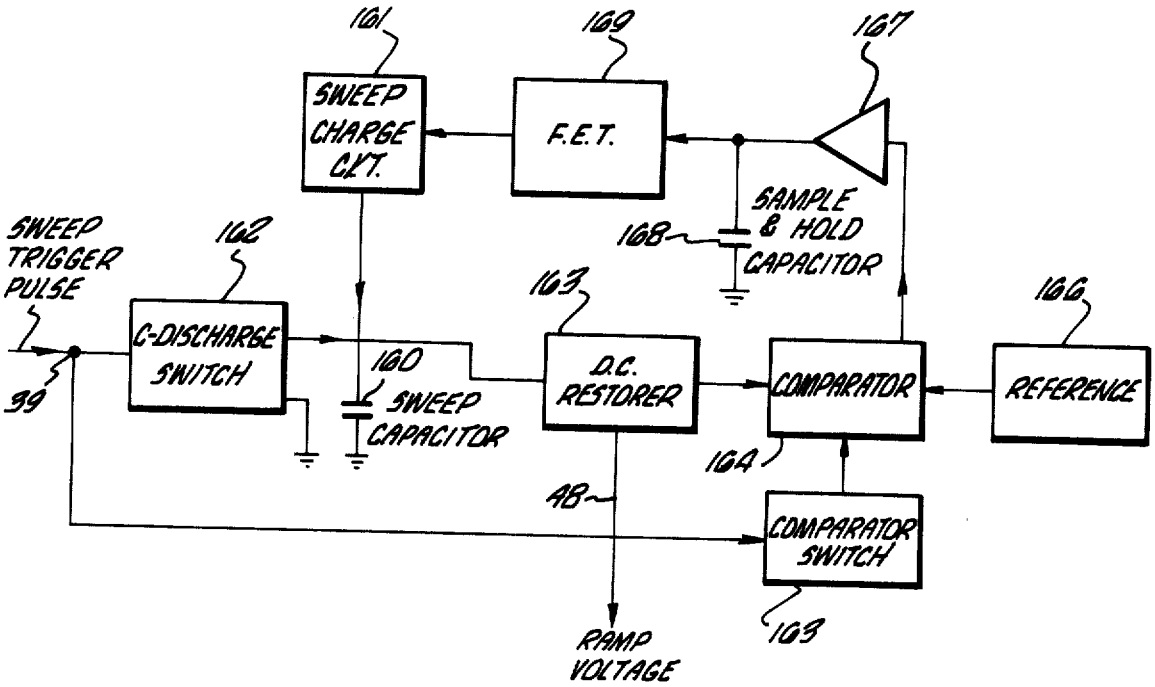
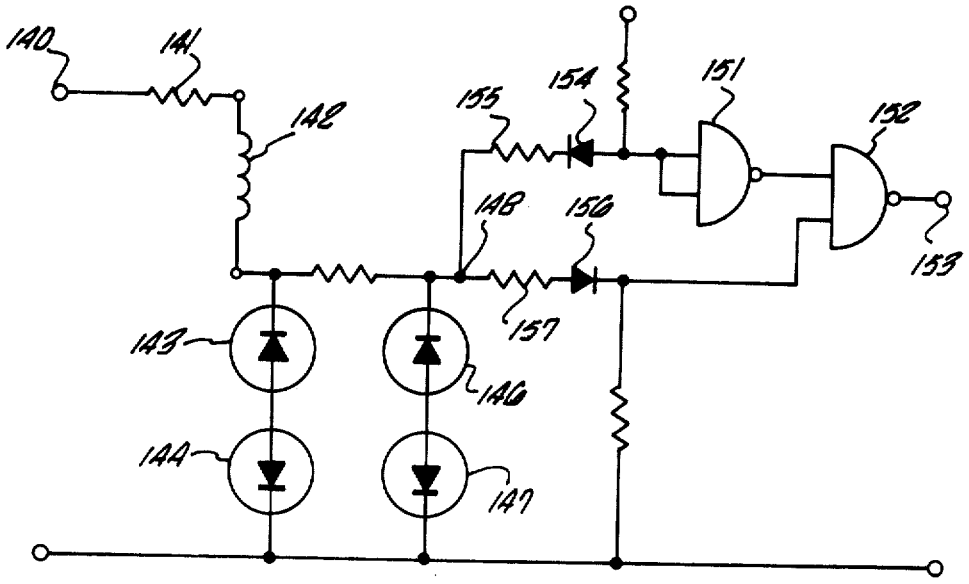
FIG. 3

ENGINE IGNITION AND POWER ANALYZER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an internal combustion engine analyzing system and, more particularly, to an electronic testing system for analyzing certain engine operating characteristics.

2. Description of the Prior Art

A number of electronic analyzers have been proposed heretofore to indicate various performance characteristics of internal combustion engines, and particularly the functioning of the ignition system. Also, it has been previously proposed to electronically determine the relative contribution of each cylinder to overall performance of the engine by rendering any desired cylinder inoperative, while the engine is running, without affecting the operation of the other cylinders. These devices of the prior art have frequently employed cathode ray oscilloscopes to provide a visual display of test data. Additionally, timing advance measuring apparatus have been proposed heretofore which will produce an indication of the degree of advance ahead of the top dead center position of the piston in the cylinder. Representative devices of the aforementioned types are disclosed in respective ones of U.S. Pat. Nos. 2,355,363; Re 26,163; 3,404,333 and 3,368,143.

These prior art instruments have not been widely employed in diagnostic and service shops due to certain complexities in their use, difficulties encountered in their calibration, and for other reasons which will be discussed hereinafter. For example, in an engine analyzer of the type which selectively represses ignition in a given cylinder, it has been the practice heretofore to anticipate cylinder fire, in order to short out the desired cylinder, by timing from the instance of the previous cylinder fire. This technique imposes a practical restriction on the engine r.p.m. Therefore, dynamic tests over a wide range of operating conditions cannot be made.

If the anticipation of cylinder fire can be related to rotational degrees of the engine, instead of time since the previous cylinder fire, then the system may be made to operate independently of engine r.p.m. Such is the case in the present invention. Other improvements over engine performance analyzers of the prior art will be described in a subsequent part of this specification.

SUMMARY OF THE INVENTION

The present invention provides an apparatus for electronically testing the performance of an internal combustion engine having an ignition time interval for each cylinder during which ignition normally occurs. The apparatus includes means such as a probe coupled to the engine for generating a first control pulse in response to the ignition time interval for each of the cylinders. The probe, for example, may be coupled to the ignition coil. Means responsive to each occurrence of the first control pulse produces a second control pulse which is delayed from the occurrence of the first control pulse by an amount directly proportional to the interval between successive times of cylinder ignition.

The apparatus further includes means such as a ring counter responsive to the second control pulse for generating anticipatory ignition suppression signals in advance of the ignition times in respective cylinders. Means are further provided for suppressing the ignition in a selected cylinder in response to the ignition suppression signals.

The means for producing the second control pulse may include a servo sweep generator which generates a ramp voltage of fixed amplitude so that any selected amplitude level on the ramp voltage will correspond to a predetermined piston position in the respective cylinder which is about to fire. A level trigger circuit may then be used to produce the second control pulse each time the ramp voltage reaches the selected amplitude. By this means the second control pulse is always coincident with a predetermined piston position independently of the rotational velocity of r.p.m. of the engine.

The means for suppressing the ignition in selected cylinders may conveniently be in the form of a shorting switch connected across a primary winding of the ignition coil. A meter indicating the engine r.p.m. for a given load may be referred to when individual cylinders are shorted for the purpose of determining which cylinder or cylinders are deficient in power contribution.

The analyzer preferably includes means for displaying the spark patterns of each of the cylinders on an oscilloscope in one of the three optional display modes, i.e., superimposed, vertically spaced or horizontally spaced on the oscilloscope screen. The analyzing circuits of the present invention are inherently self-synchronizing and may be coupled to the engine with simple clips.

BRIEF DESCRIPTION OF THE DRAWINGS

FIGS. 2A, 2B, 2C and 2D illustrate the waveforms taken at various points in the circuit of FIGS. 1A, 1B and 1C;

FIG. 3 is a block diagram of a servo sweep generator which may be used in the analyzer circuit of FIGS. 1A, 1B and 1C; and FIG. 4 is a schematic diagram of a pulse shaping circuit which may be used for making the primary pickup signal insensitive to polarity.

DESCRIPTION OF THE PREFERRED EMBODIMENT

Figure 1A:
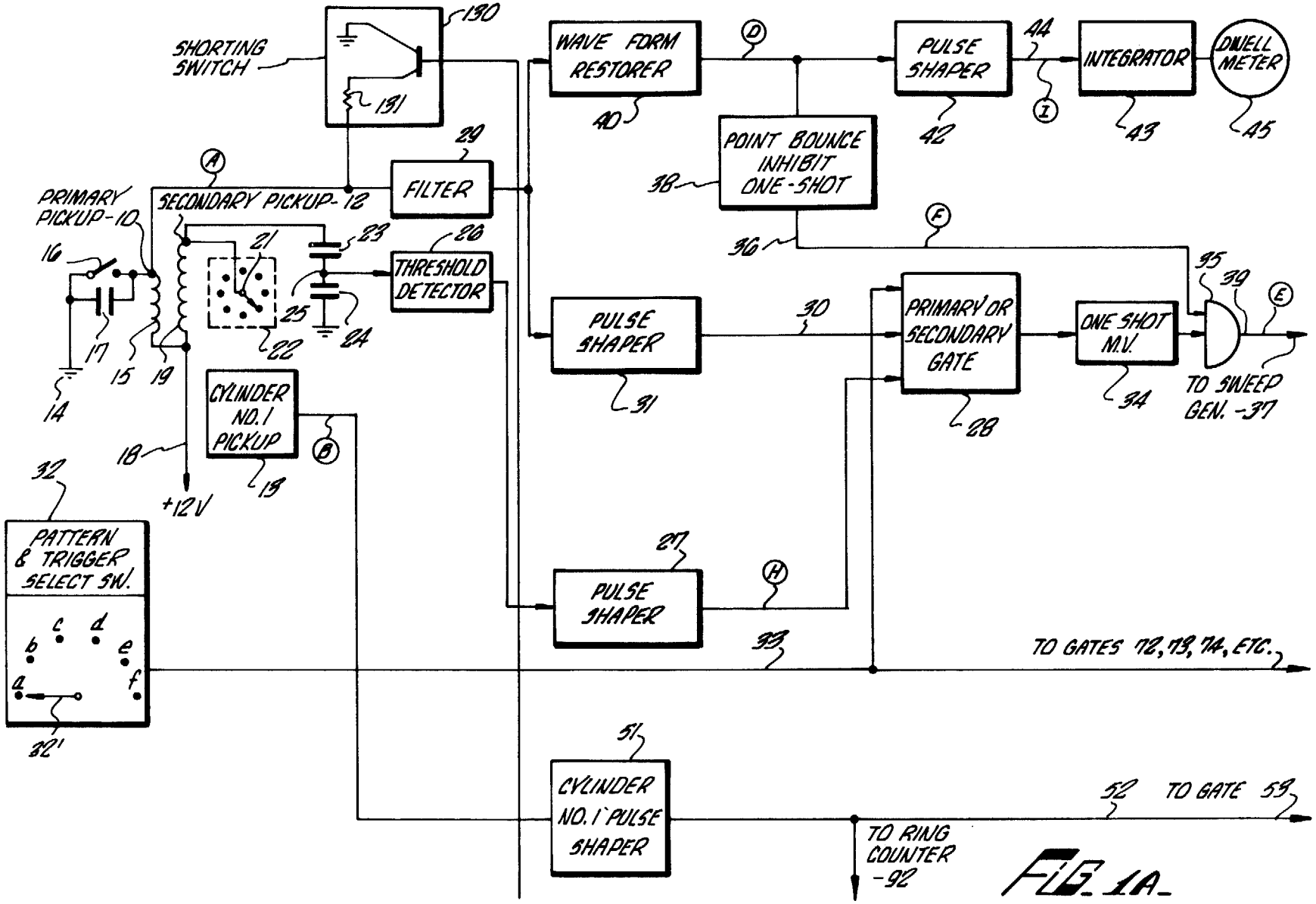
FIGS. 1A, 1B and 1C comprise a block diagram of an engine ignition and power analyzer in accordance with a preferred embodiment of the invention.
Figure 1B:
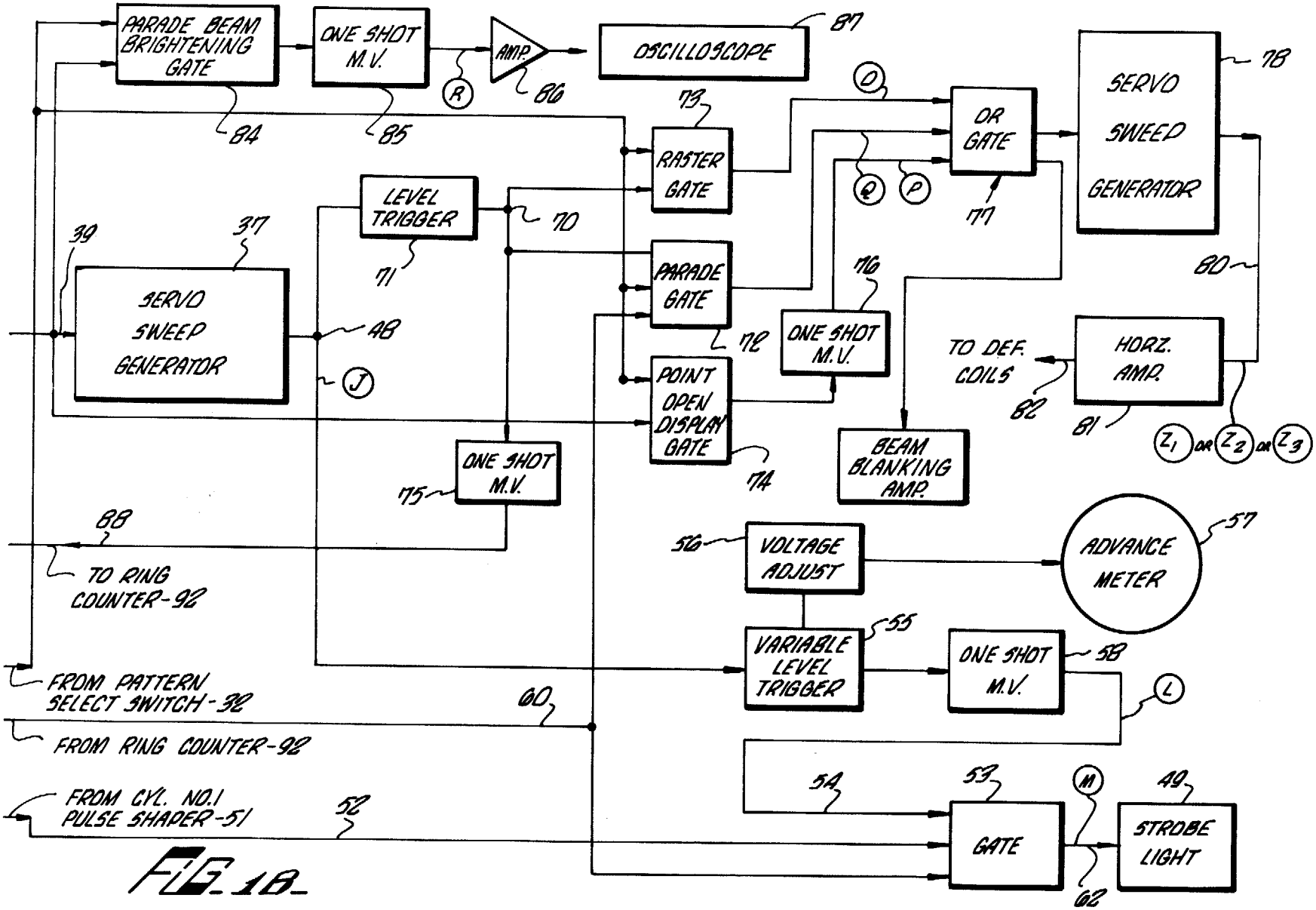
Figure 1C:
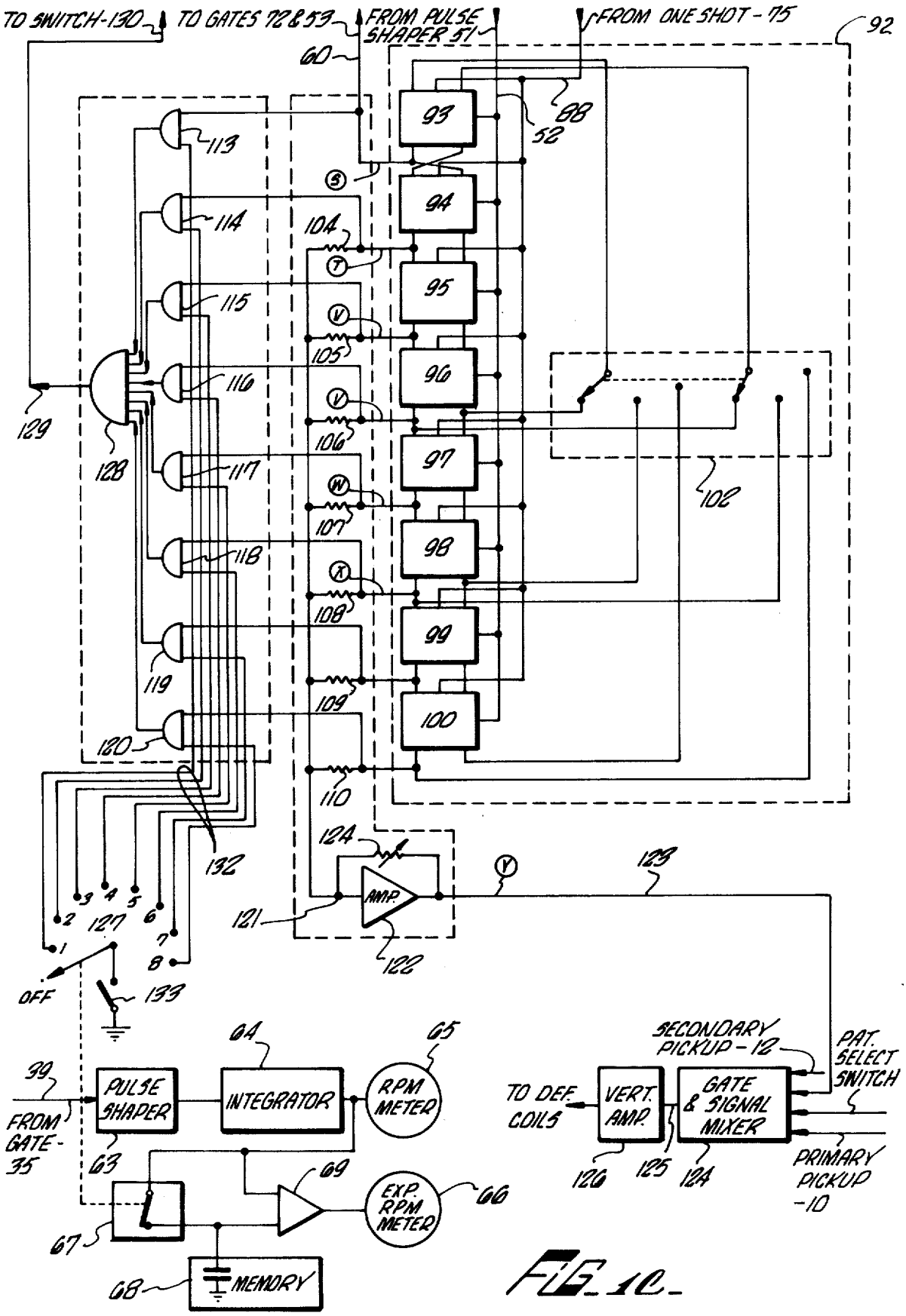

Referring now to the block diagram of FIGS. 1A, 1B and 1C, the apparatus of the present invention requires but four input connections to the engine under test, i.e., a primary pickup 10, a secondary pickup 12, a number one cylinder pickup 13, and a connection to ground 14. The primary winding 15 of the engine's ignition "coil" is connected between switch or breaker "points" 16 and the positive terminals 18 of the engine's battery. This typically is a +12 volt terminal. A capacitor 17 is shunted across points 16 in a well-known manner. The secondary winding 19 of the ignition coil is connected to an arm 21 of the engine's distributor 22. Series capacitors 23 and 24 comprise a voltage-dividing network which reduces the high voltage ignition pulse appearing at distributor arm 21 to a relatively low value at junction 25 which is compatible with the input circuit of the analyzer of the invention. The waveform of the pulse trains appearing at the primary and secondary pickups are indicated at A and C respectively in FIG. 2A. The curves in FIGS. 2A, 2B, 2C and 2D are cross referenced by corresponding letters on FIGS. 1A, 1B and 1C to illustrate representative waveforms taken at various points in the circuit.

The attenuated secondary ignition pulse signal from junction 25 is sent through a threshold detector 26 which passes that portion of the ignition pulse which exceeds a given input level. The signal obtained from the detector 26 is changed to a square wave of fixed width by means of a pulse shaper 27, and supplied as one input to a gate 28. The waveform of the output voltage from the pulse shaper 27 is indicated at H in FIG. 2B.

The pulse appearing at the primary 15 of the ignition coil is supplied through a low pass filter 29 to pulse shaper 31 where it is converted to a square wave which is supplied to gate 28 via line 30. The pulse shaper 31 (shown in detail in FIG. 4) is responsive to either positive or negative going pulses. This renders the analyzer insensitive to the manner in which the battery is connected to the engine's distributor.

The gate 28 receives a third input from a manually controlled pattern and trigger select switch 32 via line 33. The switch 32 is provided with a rotating switch arm 32' which engages one of the stationary contacts a,b,c,d,e or f to control the gate 28 so that input pulses from either the primary or the secondary pickup appear at the output of the gate. The six positions a–f of the switch 32 also determine the display mode of the system; namely "stacked", "parade", or "superimposed", as will be discussed more fully in connection with FIG. 1B.

Figure 2A:
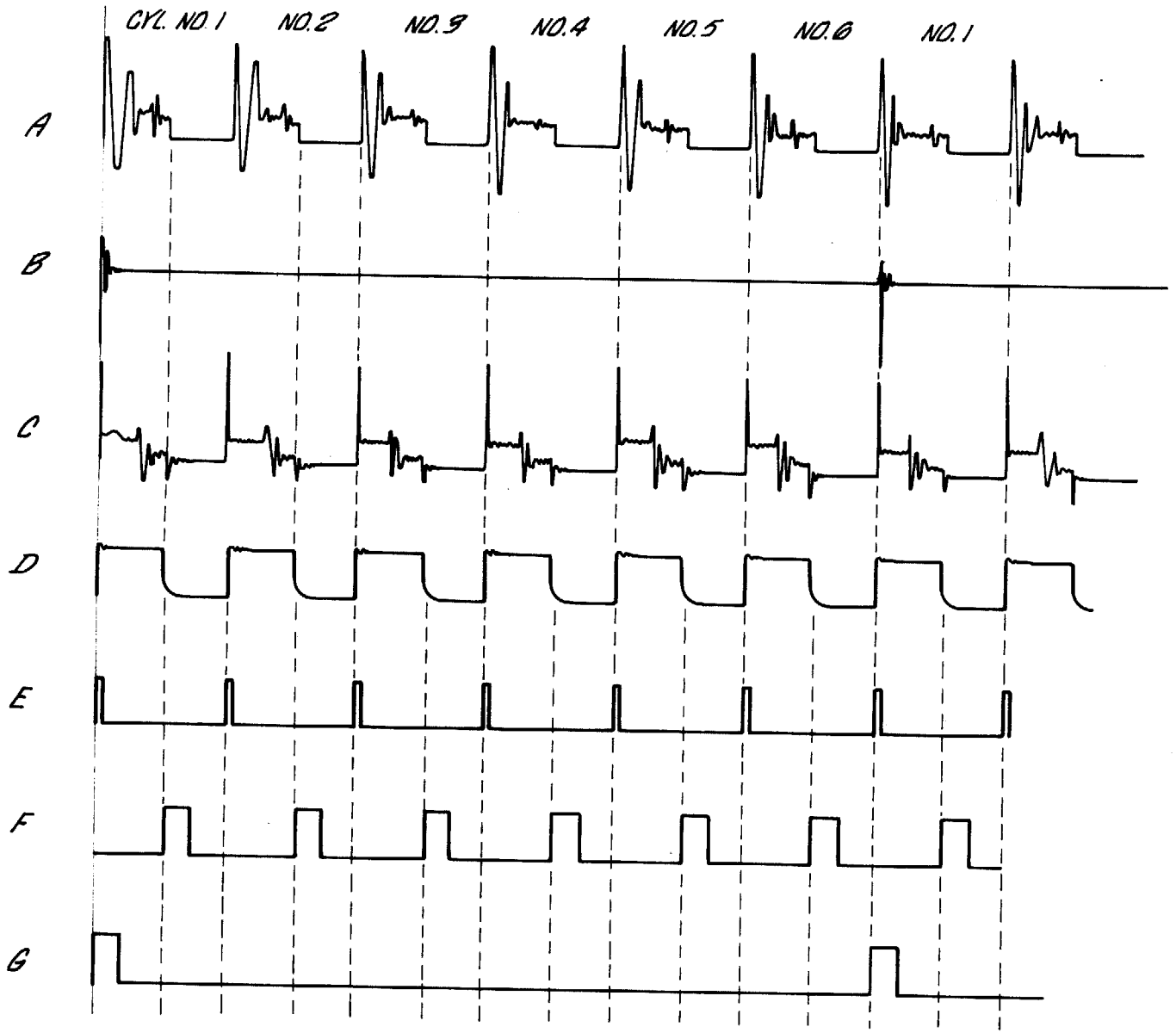

The output from the gate 28 is fed to a one-shot multivibrator 34 where it is converted to a narrow square wave as shown at E on FIG. 2A. The output pulse from the multivibrator 34 is supplied to the input 39 of a servo sweep generator 37 via a gate 35. See FIG. 1B. Gate 35 receives as its two inputs, the output pulse from the multivibrator 34 and a square wave on line 36 obtained from a one-shot multivibrator 38. (See F in FIG. 2A). The multivibrator 38 is controlled by the output pulse from a waveform restorer 40 which converts the output from filter 29 to approximately a square wave, as shown at D in FIG. 2A, the width of which is subsequently determined by the one-shot 38. The output on line 36 is supplied to the inhibit input of gate 35. This arrangement inhibits any bounce of point contacts 15 from appearing as two or more distinct input pulses to the system which would cause the servo sweep generator to drop out of synchronism. When a true ignition pulse in the primary winding 15 is generated, a square wave will appear on line 30 to gate 28.

The squared-up ignition pulse from waveform restorer 40 is shaped and clipped via pulse shaper 42 and then integrated in integrator 43. The integrated output which is a function of the dwelltime of points 16, is supplied to meter 45, where it is displayed as "dwelltime". It should be noted that the output signal from the waveform restorer 40 (Curve E, FIG. 2A) has a steep leading edge due to the high current surge when the points are initially closed and a sloped trailing edge. The area under the sloped trailing edge of the restored primary pulse is fixed whereas the area under the remainder of the waveform varies with r.p.m. The pulse shaper 42 eliminates this possible error by making the rise time of the restored primary pulse substantially equal to its fall time (e.g., by means of a suitable RC network) and then clipping the resultant wave. The output square wave from the pulse shaper 42 is delayed slightly from the restored primary wave as is shown at I in FIG. 2B.

Depending upon whether the primary waveform or the secondary waveform is to be used for triggering purposes (as determined by the setting of the pattern select switch 32), the selected signal will be supplied on input line 39 to a servo sweep generator 37. In most instances it is preferable to use the primary waveform but the secondary waveform may be more useful when the ignition points are badly pitted or access to the primary is not possible. The input signal to the sweep generator 37 may be considered as a first control pulse which occurs in a fixed time relationship, (e.g., coincident with the ignition in each of the cylinders.)

The first control pulse (E, FIG. 2A) initiates the generation of a sawtooth or ramp voltage (J, FIG. 2B) by the sweep generator 37. The amplitude of the ramp signal appearing on output line 48 is independent of the pulse repetition rate of the input signal on line 39. This permits the synchronization of the cylinder shorting operation with predetermined piston positions so that the spark plug of a selected cylinder may be shorted in advance of its normal firing time independently of the engine r.p.m. as will be discussed more in detail. The use of a sweep generator similar to 37 for the oscilloscope also permits the engine diagnosis signals to be displayed on an oscilloscope at a constant horizontal amplitude over a varying range of frequencies, while maintaining the display in synchronism with the engine's speed. This provides a full-width picture on the screen, irrespective of engine speed.

Various sweep circuits, suitable for performing the function of the servo sweep generator 37, are known in the art. One servo sweep generator which is particularly well suited to the present invention is illustrated in block diagram form in FIG. 4. The circuit for such a generator is described in more detail in co-pending patent application, Ser. No. 792,371, filed Jan. 21, 1969, now U.S. Pat. No. 3,583,217 of common assignee with the present application.

In addition to controlling the cylinder shorting operation, and the horizontal sweep circuit of the oscilloscope, in a manner to be described in a subsequent portion of this specification, the output ramp signal on line 48 is also used to control a strobe light 49, as will now be described. The purpose of the strobe lamp circuit is to measure the degree of ignition advance in the engine by illuminating a reference mark on a rotating part of the engine, such as the fly wheel, by a flashing lamp. The position of the illuminated reference mark is either read by means of a fixed scale on the engine block or the time of flashing is adjusted until the illuminated reference is aligned with a fixed pointer corresponding with the top dead center position of one of the pistons, such as the number one piston. Timing lamps of this general type, and their use, are well known to those skilled in the art. In the present invention a novel and improved circuit is employed to control the flashing interval of the lamp 49.

Figure 2B:
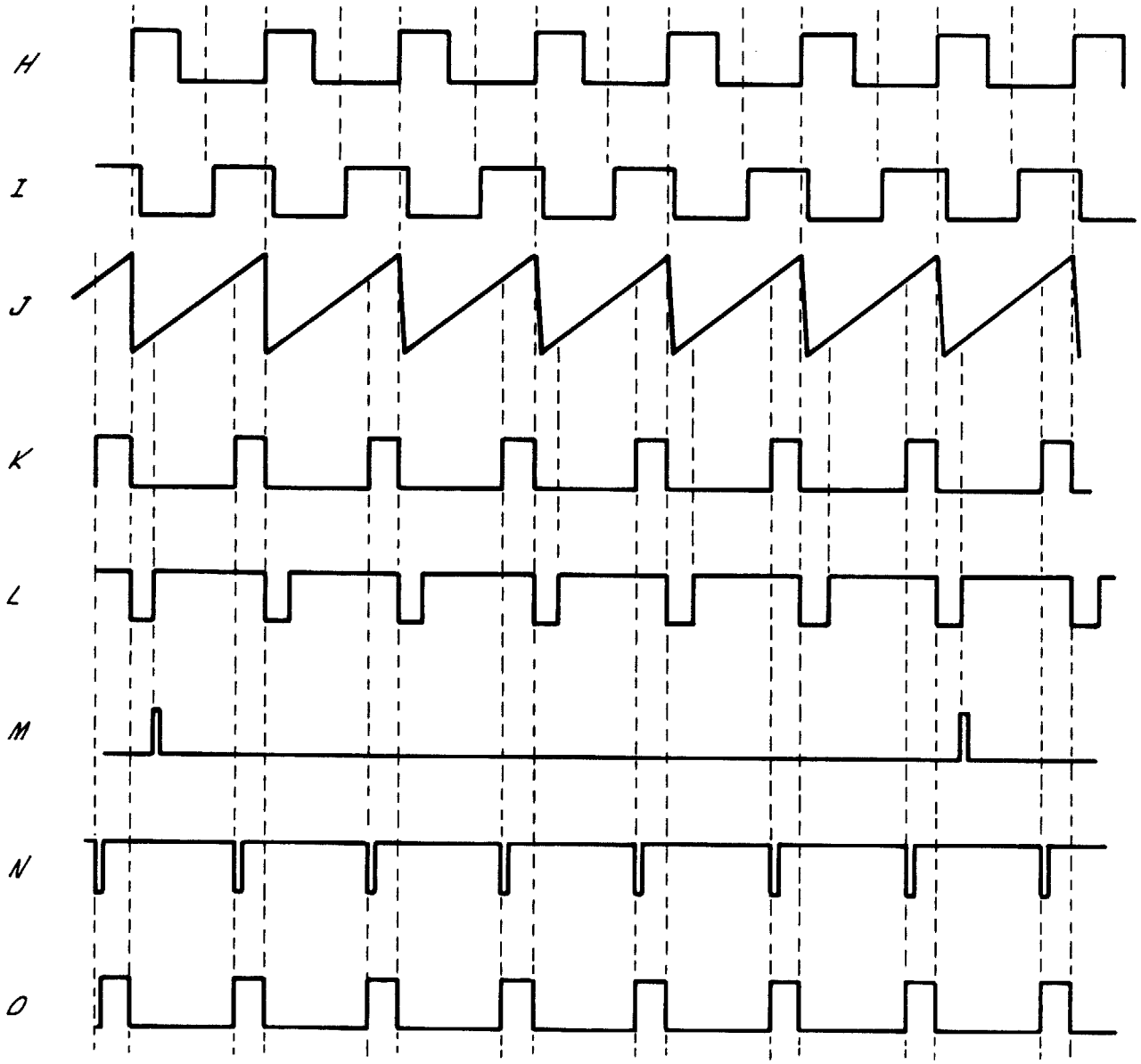
Figure 20:
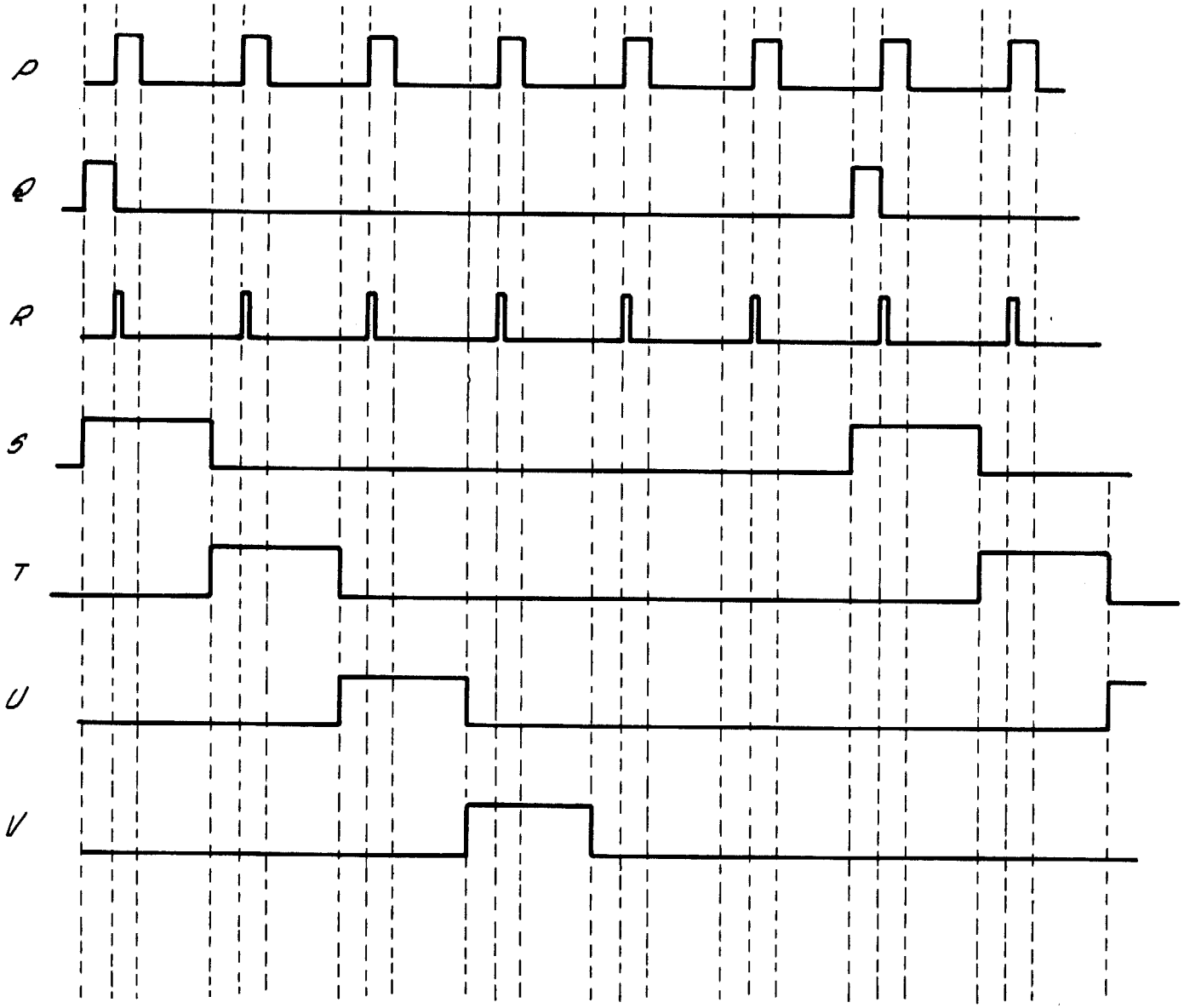

A signal from the number one cylinder pickup 13 is changed to a square wave pulse having a width of approximately 400 microseconds via pulse shaper 51. This signal, appearing on line 52, is supplied as one input to strobe control gate 53. A second input (line 54) to the gate 53 is derived from the output line 48 of the servo sweep generator 37. This signal on line 48 comprises a voltage ramp (J as shown in FIG. 2B) which causes a variable level trigger 55 to switch when a preset voltage level is reached. The trigger level is manually selected by means of a voltage adjust 56. The output trigger pulses (L, FIG. 2B) from the trigger 55 are supplied to the second input 54 of the gate 53 via a one-shot multivibrator 58. An advance meter 57 provides a measure of the voltage setting of 56, which is directly proportional to the degree of timing advance.

The third input to gate 53 comprises a square wave pulse, appearing on line 60 and shown at S on FIG. 2C. The square wave pulse brackets the firing interval for the number one cylinder and is obtained from a ring counter 92, which will be described in connection with FIG. 1C. The square wave pulse (S, FIG. 2C) is sometimes referred to as the third control pulse hereinafter.

The gate 53 is arranged to pass only the combination of pulses on lines 54 and 60 or the pulses on line 52. The combination of pulses on lines 54 and 60 which appears on the line 62 comprises a narrow pulse, shown at M in FIG. 2B, which occurs at a selected delay following the firing of the number one cylinder. Since the voltage of the servo sweep generator 37 is directly proportional to engine rotation degrees, a readout of engine advance in degrees is obtained independent of r.p.m. This pulse (M, FIG. 2B) will cause lamp 47 to flash so that the reference mark on the rotating part of the engine may be observed with respect to a fixed reference pointer on the engine block which represents the top dead center position of the number one piston. The delay between the ignition of the number one cylinder and the energization of the strobe light is manually set by the voltage adjust 56 until the reference mark on the flywheel is aligned with the fixed pointer. The degree of engine ignition advance may then be read on the meter 57. The strobe light may also be flashed in synchronism with the number one cylinder fire by the pulse on line 52. In this mode of operation the degree of timing advance is read by means of the fixed scale in a conventional manner.

The pulse train appearing on line 39 may also be used to indicate engine r.p.m. This is accomplished by means of a tachometer circuit comprising pulse shaper 63, integrator 64 and r.p.m. meter 65, as illustrated in FIG. 1C. Changes in r.p.m. which occur when the various cylinders are shorted out may be clearly seen by means of an "expanded r.p.m. meter" 66. This auxiliary r.p.m. meter 66 compares the non-shorted condition (established by switch 67) with the cylinder shorted condition, by means of a holding capacitor 68 and a differential amplifier 69. This tachometer circuit is not in itself a part of the present invention except as it is incorporated into an overall engine analyzer and as adapted to operate from the pulse train appearing on line 39. A detailed description of the tachometer circuit and its functioning can be found in copending application, Ser. No. 699,212, filed June 19, 1968 now U.S. Pat. No. 3,472,066 having a common assignee herewith.

Signals derived from the ignition coil are employed to produce one of several selectable patterns on the oscilloscope screen indicating the firing characteristics and other operating parameters of the engine. Separate traces, one for each cylinder of the engine, may be displayed in a superimposed manner to permit characteristics of all cylinders to be viewed simultaneously and compared. This type of display is referred to as "superimposed". Also, a staircase generator permits the waveforms of the several cylinders to be vertically displayed or stacked, if desired, so as to provide identification of horizontal traces. This type of display is referred to as "stacked". The traces of all cylinder firing patterns may also be horizontally displayed, e.g., a "parade" pattern. Certain of the waveforms displayed on the oscilloscope are shown in FIG. 2A and will be separately identified hereinafter. By way of example, waveforms for a six-cylinder engine are illustrated.

The mode of the pattern display is controlled by the pattern select switch 32, a level trigger 71, a raster gate 73, a parade gate 72 and a point open display gate 74. The operation of the pattern and trigger select switch 32 is illustrated by the following table, where the letters in the left hand column represent the corresponding stationary switch contacts.

| Switch position | Display mode | Sweep control gate | Displayed waveform | Trigger pulse for sweep |
|---|---|---|---|---|
| (a) | Superimposed. | Raster-73 | Primary pickup. | Primary (O,FIG. 2B). |
| (b) | " | Point open-display-74 | Secondary pickup. | Secondary (P.FIG. 2C). |
| (c) | " | Raster-73 | " | Primary (O, FIG. 2B). |
| (d) | Parade | Parade-72 | Secondary pickup (15 kv.). | " |
| (e) | " | " | Secondary pickup (30 kv.). | Primary (O, FIG.2C). |
| (f) | Stacked | Raster-73 | Secondary pickup. | " |
| (g) | Remote switch | | | |

The switch positions "d" and "e" provide a parade display of the secondary pickup signal at two different voltage settings for the oscilloscope election beam, i.e., 15 kv. and 30 kv. The position "g" for the pattern select switch 32 connects a remote control switch (not shown) to the analyzer of FIGS. 1A, 1B and 1C. The remote switch enables the operator to select switch positions "c", "d" and "f" from a remote location, e.g., the driver's seat in an automobile. The remote control switch arrangement is the subject matter of co-pending patent application, Ser. No. 792,385, filed Jan. 21, 1969, now U.S. Pat. No. 3,583,217 of common assignee with the present application. If desired the entire pattern select switch 32 may be remotely located from the analyzer. It should be noted that the particular selection of data to be displayed, display patterns, and sweep trigger pulses for the various selector switch position are given by way of example only. Many other combinations may be added to or substituted in place of those set forth in the above table.

The circuits including the level trigger 71 and the gates 72, 73 and 74 for providing the sweep voltage for the oscilloscope will now be described. The ramp signal appearing on line 48 (FIG. 1B) causes the level detector or trigger 71 to conduct when a preset voltage level is reached. The trigger 71 produces an output when the input falls above the present trigger level. This appears as a rectangular pulse (shown at K in FIG. 2B) on line 70 which is supplied to a raster gate 73 and a parade gate 72. The output of the trigger 71 may be considered a second control pulse for purposes of analyzing the operation of the circuit. This second control pulse is delayed from the occurrence of the first control pulse by an amount which is directly proportional to the interval between successive times of cylinder ignition. In other words, the second control pulse is coincident with a particular piston position in the respective cylinder next to be fired, irrespective of engine r.p.m.

The output pulse from the level trigger 71 is changed to a narrow pulse, i.e., 25 microseconds duration (indicated at N in FIG. 2B) by a one-shot multivibrator 75 which is used as the clock pulse for a shift register or ring counter 82. (FIG. 1C) to be described.

The output pulse from the level trigger 71 also appears at the output of the raster gate 73 and on OR gate 77 when the pattern select switch is set at position a or c. See waveform O in FIG. 2B. In this mode of operation the ramp sweep voltage for the oscilloscope is controlled by the output pulse from the trigger 71. The use of raster gate 73 results in the display of the secondary pickup signals in either a superimposed pattern, or in a vertical stacked pattern. A staircase voltage is applied to the vertical deflection coils of the oscilloscope to provide the vertical stacked display, as will be described in more detail.

The parade gate 72 includes an additional input from line 60 on which appears the third control pulse or a square wave (S, FIG. 2C) bracketing the firing time interval for the number one cylinder. The parade gate 73 passes the output from the trigger 71 to a servo sweep generator 78 via the OR gate 77 only during the time interval that the third control pulse is present on line 60 or during the number one cylinder firing time. See waveform Q, FIG. 2C. The parade gate is enabled when the pattern select switch 32 is set at positions d or e.

The "point open display gate" 74 is used for observing the signal appearing at the secondary winding 19 of the ignition coil with emphasis of display at the instant of point opening. In this mode the pattern select switch is set at position b. The input circuits of the point open gate 74 are connected to the pattern select switch 32 and the line 39. When the pattern select switch is set to display point opening phenomena the trigger pulse on line 39 (E, FIG. 2A) is fed to a one-shot multivibrator 76. The one-shot 76 produces an output square wave pulse shown at P in FIG. 2C for controlling the ramp sweep voltage for the oscilloscope. The trigger pulse on line 39 is derived from the secondary voltage pickup 12 in this display mode.

Figure 2D:
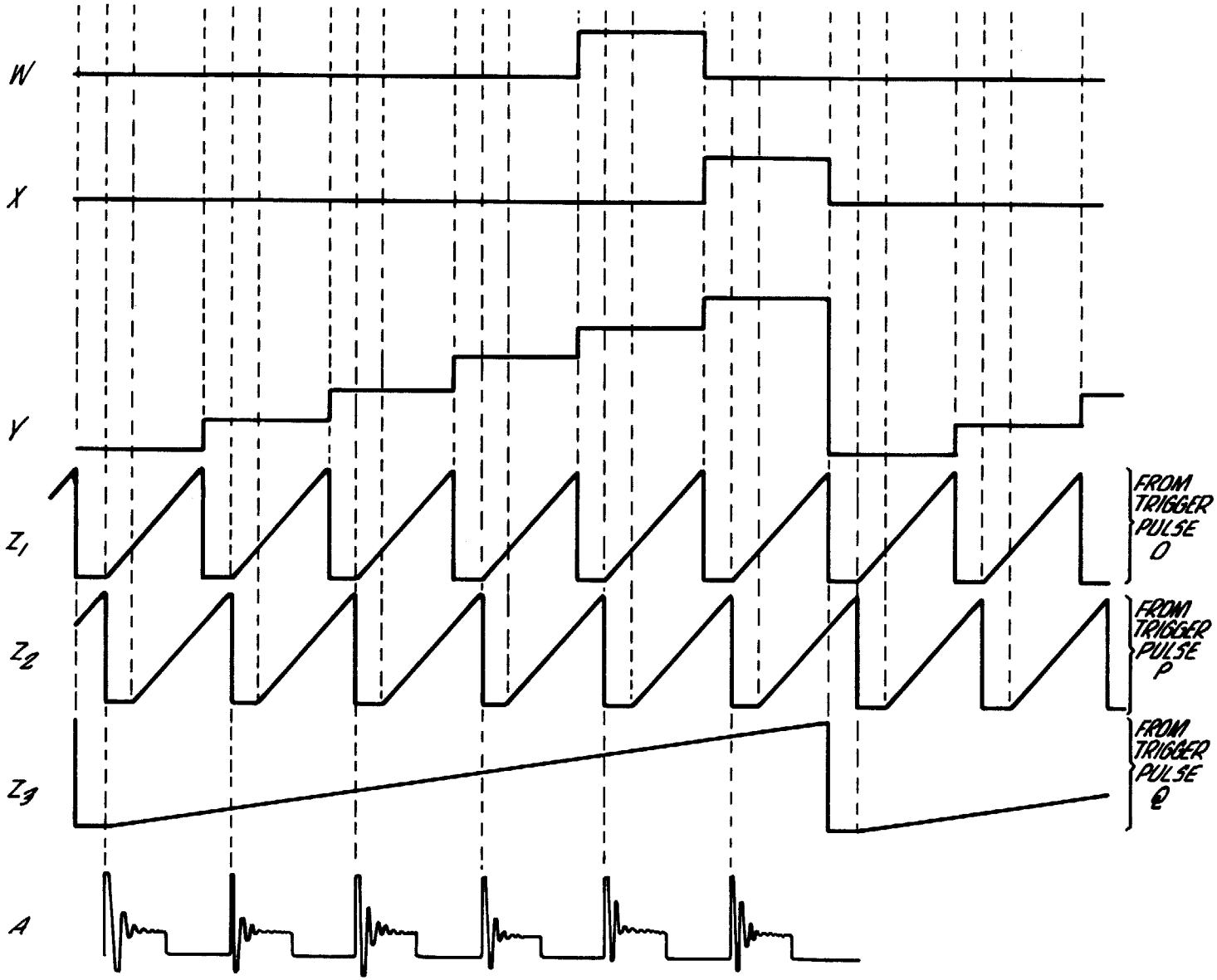

The selected one of these signals O, P or Q) is sent via an OR gate 77 to an input 79 of a servo sweep generator 78 and also to beam blanking amplifier 79. Suitable and well-known means, not shown, are employed to direct an electron beam on the screen of the oscilloscope during the writing of the waveform patterns. On the return track, a beam blanking amplifier 79 suppresses the beam. The servo sweep generator 78 is identical in construction with that of 37, and provides a ramp voltage on output line 80 which is amplified by horizontal amplifier 81 to serve as the horizontal sweep signal applied via line 82 to the horizontal input or horizontal deflection coils of the oscilloscope. Depending upon whether the O, P or Q signal is selected by the pattern select switch 32, the ramp signal on line 70 will be $Z_1$, $Z_2$ or $Z_3$ as indicated in FIG. 2D. This will result in the display being either superimposed, stacked or parade patterns.

It is desirable to brighten the beam during the short time interval in which the points are opening when the parade pattern is being used, (e.g., switch 32 in positions d or e). For this purpose a parade beam brightening gate 84 is connected to the pattern select switch 32 and to the line 39 for triggering a one-shot multivibrator 85 in response to each occurrence of the first control pulse on line 39. The multivibrator 85 produces an output pulse (R, FIG. 2C) which is coincident with the ignition of each cylinder. The output pulse from the multivibrator 85 is supplied to the beam brightener control in the oscilloscope 87 via an amplifier 86.

The circuits for selectively repressing the firing of the individual cylinders of the engine will now be described. The pulses which appear on line 39 are coincident with cylinder firing and trigger the servo sweep generator 37. Anticipation of cylinder ignition or fire is realized by level trigger 71 which produces the second control pulses on line 70 when a preset level of the triggered sweep is reached. The pulses on line 70 trigger the one-shot multivibrator 75 which produces negative going narrow pulses on line 88 as shown at N in FIG. 2B. Since the output ramp voltage is servoed with the engine's r.p.m. by means of the input signal on line 39, the pulses on line 70 and 88 remain a fixed proportion in advance of each of the cylinder fire pulses in terms of degrees of distributor arm (21) rotation.

The delayed pulses on line 88 are then used to trigger the ring counter 92 comprising the cylinder register as illustrated in FIG. 1C. The ring counter 92 comprises eight J-K type flip-flops 93–100 which are connected into a ring counter configuration, with line 88 serving as the input pulse bus. The reset pulse is obtained from the cylinder number one pulse shaper 51 via line 52. The reset bus 52 is connected in common to all of the flip-flops 93–100. Feedback connections are provided from the first flip-flop 93 to flip-flop 96, 98 or 100 via appropriate contacts on selector switch 102 in order to form a ring counter having four, six or eight registers as required by a corresponding number of engine cylinders.

The outputs of the several registers (93–100) are illustrated at S, T, U, V, W, X, etc. in FIGS. 2C and 2D. These output signals are supplied to a current summing network comprising weighted resistors 104–110, and also to corresponding inputs of gates 113–120. A summing junction 121 serves to add the output currents from the ring counter 92 by means of the resistors 104–110 in a conventional manner to provide a staircase current waveform which is amplified to a representative voltage via amplifier 122 and appears on line 123. The overall amplitude of the staircase waveform (shown at Y in FIG. 2D) is set by gain control 124. This permits the gain to be set in accordance with the number of cylinders (e.g., four, six or eight) and thereby make full use of the oscilloscope screen. The staircase waveform (Y) is combined with the secondary pickup signal in a gate and signal mixer 124. This combined output, appearing on line 125 is amplified by the vertical deflection amplifier 126 and applied to the vertical input or vertical deflection coils of the oscilloscope. The pattern select switch 32 controls the gate 124 to pass the primary pickup signals alone or the secondary pickup signals with or without the staircase waveform (Y) to the vertical amplifier. The staircase waveform from the amplifier 123 is added to the secondary pickup signal by the gate 124 only when the pattern select switch 32 is set in the "stacked" mode, e.g., switch position f.

Each successive input pulse on line 88 (input counter pulse bus) causes the conducting state of the ring counter 82 to advance from one register to the next. If any given register is in the incorrect condition when a pulse coincident with the number one cylinder fire pulse arrives on line 52, the register is precleared to the correct condition. Only one pulse from the number one cylinder is required to set up the entire register which then continues to operate in a ring counting mode. Once the ring counter has been preset by a pulse from line 52, the number one cylinder may thereafter be shorted out for testing, without loss of synchronization.

The state of the flip-flops comprising the ring counter 82 corresponds to order of firing of the engine's cylinders. That is, when a particular cylinder is firing, an associated register in the ring counter will be activated. These states correspond to gate signals, (S, T, U, V, W, X, etc. as shown in FIGS. 2C and 2D) generated by the counter on the output lines and applied to corresponding ones of AND gates 113–120. The alternate inputs to these gates is to ground via contacts on a cylinder selector switch 127. The output of gates 113–120 is supplied to an OR gate 128 and appears on line 129 which in turn supplies a control signal to the base of a cylinder shorting switch 130. See FIG. 1A. Whenever the transistor switch 130 is made to conduct, it shorts out the points 16 through a low value resistor 131 and the cylinder which would then otherwise be fired via the distributor, is shorted out. The resistor 131 permits sufficient current to flow through the primary coil 15 to provide an input to the servo sweep generator 37 via the pulse shaper 31 and gate 28 to maintain synchronization without causing the shorted cylinder to fire.

The states of conduction of the ring counter 82 are used to determine when the shorting switch 130 is closed. If the cylinder selector switch 127 is set at any contact position other than "OFF", then the corresponding cylinder will be shorted at its regular firing time, notwithstanding the actual engine speed. Note that no individual connections to the various spark plugs or distributor contacts are required to accomplish this selective shorting function.

It is important to note that the cylinder selector switch, as well as the pattern select switch, may be remotely located from the analyzer itself and interconnected therewith via a suitable multiple-wire cable such as indicated at 132. This permits the operator to conveniently place the cylinder selector switch 127 and/or the remote pattern select switch near the engine or the display panel, as desired. When the automobile is being tested on a dynamometer this feature makes it possible for one man to control the tests. The low impedance of the signal lines (cable 132) between switch 107 and gates 113–120 permits long lengths of cable to be employed without undue noise pickup or other adverse effects.

The pattern select switch 32 is set at position f for the cylinder shorting tests. The zero test switch 133 is normally closed during the cylinder shorting tests, but may be selectively opened when it is desired to check the tachometer display (by meters 65 and 66). When the zero test switch is opened, the auxiliary r.p.m. change reading (66) will go to zero, as is required at the beginning of a test at any selected engine speed in order to thereafter indicate speed differentials. The differential r.p.m. reading (66) provides a measure of the power contributed by the individual cylinders as such cylinders are shorted.

The pickup probes and input circuitry of the present invention are insensitive to the polarity of the ungrounded battery terminal in the engine undergoing analysis as discussed previously. The pulse shaper 31 which conditions the primary pickup signal and supplies an input pulse to the gate 28 independently of the polarity of the pulse at the primary coil of the ignition is shown in schematic form in FIG. 3. The primary pickup signal appearing on input terminal 140 is filtered by the resistor 141 and the inductor 142 (low pass filter 29, FIG. 1A) and then clamped to a predetermined voltage level by Zener diodes 143 and 144. The input signal is further filtered by resistor 145 and clamped to a lower voltage level by Zener diodes 146 and 147 to match the maximum amplitude of the input signal appearing on line 148 with the input characteristics of the analyzer circuit.

A pair of gates 151 and 152 are connected between an output terminal 153 and the line 148 to provide a negative going output pulse in response to the cylinder ignition. A diode 154 and resistor 155 are connected between the line 148 and both inputs to the gate 151 and a diode 156 and resistor 157 are connected between one input to the gate 152 and the line 148 as shown. The output of gate 151 is connected to the second input of the gate 152 and the output of the gate 152 is connected to the output terminal 153.

The output of the gate 151 is normally low and the output of the gate 152 is normally at high potential. The gate 151 provides a positive output signal when the input signals negative (negative signal on line 148) and a zero output signal when the input signals are positive (positive signal on line 148). The gate 152 provides a negative output signal when both inputs are either positive (positive signal on line 148) or negative (negative signal on line 148). Thus the pulse shaper circuit of FIG. 3 provides a negative output pulse in response to either a positive or negative input pulse. This eliminates the necessity for the operator to make any changes in the analyzer circuit to accommodate engines having different battery connections.

The servo sweep generator 37 for providing a ramp voltage of constant amplitude independently of the repetition rate of the input signals will now be described in reference to FIG. 4. The sweep generator 37 includes a sweep capacitor 160 which receives a charge from a sweep charging circuit 161. A discharge switch 162 receives the sweep trigger pulses appearing on line 39 of FIG. 1A and discharges the sweep capacitor 160 in response to such pulses. The trigger pulses appearing on line 39 are also supplied to a comparator switch 163 which actuates a comparator or differential amplifier 164. The comparator 164 has one input coupled to the sweep capacitor 160 by a DC restorer 165 and another input connected to reference voltage source 166.

The comparator 164 compares a fixed reference voltage with the maximum voltage appearing on capacitor 160 or that voltage which appears across the sweep capacitor just prior to its discharge. The output of the comparator 164 is supplied to a sample and hold capacitor 168 via an amplifier 167. A field effect transistor 169 is connected between the sample and hold capacitor 168 and the charge circuit 161 to control the magnitude of the current supplied to the sweep capacitor 160, in accordance with the magnitude of the voltage stored on the capacitor 168. The sweep charge circuit 161 supplies a fixed current to the sweep capacitor 160 for any given voltage on the sample capacitor 168, thereby providing the ramp voltage "J", FIG. 2B. The current to the sweep capacitor is increased or decreased as necessary to maintain the maximum voltage on the sweep capacitor substantially equal to the reference voltage. In this manner the peak amplitude of the ramp voltage is maintained at a fixed level with a changing repetition rate. The output ramp voltage appearing on line 48 is identical to that produced across the sweep capacitor 160, except that it is restore to ground potential.

From the foregoing description it is seen that means are provided for testing the advance timing, ignition waveform, engine power and other operating characteristics of a multiple-cylinder internal combustion engine. The waveforms or patterns displayed on the oscilloscope each comprise substantially horizontal time-base lines which are related to a common sweep rate thereby providing a synchronized display which permits a comparison of the several cylinders. Thus, without the necessity of complex connections to the engine under test, and without practical regard to any required engine speed, a thorough analysis of the engine's performance may be made.

What is claimed is:

1. In an apparatus for analyzing the operation of a multiple cylinder internal combustion engine having an ignition time interval for each cylinder during which ignition normally occurs, the combination which comprises:

means coupled to the engine for generating a first control pulse in response to the ignition time interval for each of the cylinders, means responsive to each occurrence of the first control pulse for providing a second control pulse which is delayed from the occurrence of the first control pulse by an amount which is directly proportional to the interval between the successive times of cylinder ignition, means responsive to each occurrence of the second control pulse for generating anticipatory ignition suppression signals in advance of the ignition times in respective cylinders, and means coupled to the engine and responsive to the ignition suppression signals for suppressing the ignition in a selected cylinder.

2. The combination as defined in claim 1 wherein the means for generating the ignition suppression signals includes:

a multistage ring counter having a stage individually associated with each cylinder, means coupled to the engine and responsive to the ignition of the first cylinder thereof for resetting the stages of the ring counter, and means for advancing the count in the ring counter in response to the occurrence of each second control pulse.

3. The combination as defined in claim 2 wherein the means for generating the first control pulse includes probe pickup means for generating electrical signals representative of the ignition characteristics of individual cylinders, and further including:

a cathode ray oscilloscope having horizontal and vertical inputs, means responsive to the second control pulse for generating a sawtooth sweep signal, means for coupling the sawtooth sweep signal to the horizontal input of the oscilloscope, and means for connecting the probe pickup means to the vertical input of the oscilloscope.

4. The combination as defined in claim 1 including means coupled to the number one cylinder of the engine and to the suppression signal generating means for generating a third control pulse which corresponds to the firing time of the first cylinder.

5. The combination as defined in claim 4 wherein the means for providing the second control pulse comprises:

a first servo sweep generator for generating a sawtooth voltage in response to the occurrence of the first control signal, which sawtooth voltage has an amplitude independent of the repetition rate of the ignition pulses; and a first amplitude level detector connected to the first servo sweep generator and responsive to a preset amplitude level of said sawtooth voltage to generate said second control pulse.

6. The combination as defined in claim 5 including:

a second amplitude level detector connected to the servo sweep generator and responsive to a preselected amplitude level of said sawtooth signal to generate a strobe pulse, means connected to the second level amplitude detector for varying said preselected amplitude level, and a strobe lamp responsive to the strobe and third control pulses for producing a flash of light which may be used to monitor the ignition advance of the engine.

7. The combination as defined in claim 5 wherein the means for generating the first control pulse includes probe pickup means for generating electrical signals representative of the ignition characteristics of individual cylinders and further including:

a second servo sweep generator having an input and an output, the sweep generator being arranged to generate a sawtooth sweep signal of constant peak amplitude in the output in response to the application of an input pulse to the input thereof, means for selectively coupling the second control pulse to the input of the second servo sweep generator to initiate the sweep signal, a cathode ray oscilloscope having horizontal and vertical inputs, means connecting the horizontal input of the oscilloscope to the output of the second servo sweep generator, and means connecting the probe pickup means to the vertical input of the oscilloscope.

8. The combination as defined in claim 7 wherein the means for generating the ignition suppression signals includes a multistage ring pulse counter having operative stages equal to the number of cylinders in said engine and reset means responsive to said third control pulse to place all of the said stages of said pulse counter in a reset condition, each stage of the ring counter being arranged to produce an ignition suppression signal for a respective cylinder.

9. The combination as defined in claim 8 wherein the internal combustion engine is provided with an ignition coil having a primary and a secondary winding and wherein the means for suppressing the ignition in a selected cylinder includes a shorting switch connected across the primary winding of the ignition coil for shorting said winding in response to an ignition suppression signal and gating means connected between the ring counter and the shorting switch for supplying the ignition suppression signals from a selected stage of the ring counter to the shorting switch.

10. The combination as defined in claim 9 wherein the gating means includes a remotely located cylinder selector switch connected to the ring counter and the shorting switch, the cylinder selector switch having a switch position individually associated with each cylinder of the engine.

11. The combination as defined in claim 10 wherein the means for selectively coupling the second control pulse to the input circuit of the second servo sweep generator includes a remotely located pattern select switch for selectively coupling each second control pulse or only each second control pulse which coincides with the third control pulse to the input circuit of the second servo sweep generator whereby the ignition signals may be displayed in a superimposed or a horizontally spaced pattern on the oscilloscope screen.

12. The combination as defined in claim 9 wherein the gating means includes an AND gate individually connected between each stage of the ring counter and the shorting switch and a multi-position cylinder selector switch having a number of positions at least equal to the number of cylinders of the engine and coupled to the AND gates, the selector switch being arranged so that each position thereof enables a selected AND gate to pass ignition suppression signals through said AND gate to the shorting switch.

13. The combination as defined in claim 7 wherein the means for selectively coupling the second control pulse to the input circuit of the second servo sweep generator includes a raster gate, a parade gate and a pattern select switch for selectively enabling one of said gates, and means for coupling the third control pulse to the parade gate, the raster gate being arranged to pass the second control pulse to the second servo sweep generator when enabled by the pattern select switch, the parade gate being arranged to pass the second control pulse to the second servo sweep generator only on the occurrence of the third control pulse when enabled by the pattern select switch.

14. The combination as defined in claim 13 wherein the oscilloscope includes beam brightening means for increasing the intensity of the writing beam and further including means responsive to the pattern select switch and to the first control pulse for applying a pulse to the beam brightening means of the oscilloscope to increase the intensity of the writing beam on each occurrence of the first control pulse when the raster gate is enabled.

15. The combination as defined in claim 13 including a point open gate connected to the input circuit of the second servo sweep generator and the pattern select switch for selectively coupling the first control pulse to the input circuit of the second servo sweep generator to initiate the servo sweep signal.

16. The combination as defined in claim 8 including means for selectively varying the number of stages in the ring counter to accommodate engines with different numbers of cylinders.

17. The combination as defined in claim 16 including:

a summing network connected to the stages of the ring counter for generating staircase voltage therefrom, the number of steps of the staircase voltage being equal to the number of stages in the ring counter, and means connecting said summing network to the vertical input of said oscilloscope whereby the displayed waveforms representing individual cylinders may be vertically spaced on the oscilloscope screen.

18. The combination as defined in claim 17 wherein the means connecting the summing network to the oscilloscope includes means for selectively varying the amplitude of the staircase voltage in accordance with the number of cylinders in the engine under test to permit the entire oscilloscope screen to be utilized for displaying the ignition characteristics of engines having different numbers of cylinders.

19. The combination as defined in claim 17 wherein the means connecting the summing network to the oscilloscope includes means for selectively varying the amplitude of the staircase voltage in accordance with the number of cylinders in the engine under test to permit the entire oscilloscope screen to be utilized for displaying the ignition characteristics of engines having different numbers of cylinders.

20. The combination as defined in claim 3 including means for selectively varying the number of stages in the ring counter to accommodate engines with different numbers of cylinders.

21. The combination as defined in claim 20 including:

a summing network connected to the stages of the ring counter for generating a staircase voltage therefrom, the number of steps of the staircase voltage being equal to the number of stages in the ring counter, and means connecting said summing network to the vertical input of said oscilloscope whereby the displayed waveforms representing individual cylinders may be vertically spaced on the oscilloscope screen.

22. The combination as defined in claim 1 including means responsive to the first control pulse for providing an indication of engine r.p.m., whereby the power contribution of individual cylinders can be ascertained when the ignition in each of the cylinders is suppressed.

23. In an apparatus for analyzing the operation of the multiple cylinder combustion engine provided with an ignition coil having a primary and secondary winding for supplying electrical ignition pulses to the cylinders, the combination with comprises:

probe pickup means coupled to the ignition coil for generating electrical signals representative of the ignition characteristics of individual cylinders, pulse shaping means coupled to the probe pickup means for generating a first control pulse in response to the ignition pulse for each of the cylinders, means responsive to each occurrence of the first control pulse for providing a second control pulse which is delayed from the occurrence of the first control pulse by an amount directly proportional to the interval between the successive times of the cylinder ignition, a cathode ray oscilloscope having vertical and horizontal inputs, means coupled to the horizontal input of the oscilloscope and responsive to the occurrence of the second control pulse for applying a sawtooth sweep signal of constant peak amplitude in advance of each cylinder ignition to said horizontal input, and means for coupling the probe pickup means to the vertical input of the oscilloscope.

24. The combination as defined in claim 23 wherein the means for providing the second control pulse comprises a first servo sweep generator for generating a sawtooth voltage waveform of constant peak amplitude in response to the occurrence of the first control pulse and a first amplitude level detector connected to the first servo sweep generator and responsive to a preset amplitude level of the sawtooth waveform to generate the second control pulse.

25. The combination as defined in claim 24 including means responsive to the occurrence of the second control pulse for generating an anticipatory ignition suppression signal in advance of the ignition time in each cylinder and means coupled to the ignition coil and responsive to the ignition suppression signal for suppressing the ignition in a selected cylinder.

26. The combination as defined in claim 25 wherein the means for generating the ignition suppression signal includes:

a multi-stage ring pulse counter having stages equal to the number of cylinders in said engine and further including:

means connected to the first cylinder of said engine for producing a third control pulse in response to the ignition in said first cylinder, preset means responsive to a third control pulse to place all of the stages of the pulse counter in a preset condition, and means for incrementally advancing the count on said ring pulse counter with the occurrence of each of the second control pulses.

27. The combination as defined in claim 26 wherein the means for applying the sawtooth sweep signal to the horizontal input of the oscilloscope comprises:

a second servo sweep generator having an input and an output connected to the horizontal input of the oscilloscope, the second servo sweep generator being arranged to generate the sawtooth sweep signal in response to the application of each second control pulse to the input thereof; and means for selectively applying the second control pulse to the input of the second servo sweep generator upon each occurrence thereof or upon the occurrence of the second control pulse and the third control pulse.

28. The combination as defined in claim 24 wherein the probe pickup means includes a primary pickup probe connected to the primary winding of the ignition coil and a secondary pickup probe connected to the secondary winding of the ignition coil and wherein the pulse shaping means includes gating means for selectively generating the first control pulse in response to electrical signals generated in either the primary or secondary pickup probe.

29. The combination as defined in claim 23 wherein the pulse shaping means includes an input terminal, an output terminal and a ground and a pair of gates connected between the input and output terminals thereof for providing the first control pulse of one polarity between the output terminal and ground in response to the application of a positive or negative input pulse between the input terminal and ground.

30. The combination as defined in claim 23 including:

a multistage ring counter having a stage individually associated with each cylinder, means coupled to the engine and responsive to the ignition of the first cylinder thereof for resetting the stages of the ring counter, means for advancing the count in the ring counter in response to the occurrence of each second control pulse, means for selectively varying the number of stages in the ring counter to accommodate engines with different numbers of cylinders, a summing network connected to the stages of the ring counter for generating a staircase voltage therefrom, the number of steps of the staircase voltage being equal to the number of stages in the ring counter, means connecting the summing network to the vertical input of the oscilloscope, and means for selectively varying the amplitude of the staircase voltage in accordance with the number of cylinders in the engine under test to permit the entire oscilloscope screen to be utilized for displaying ignition characteristics of engines having different numbers of cylinders.

31. Apparatus for analyzing the functioning of a multiple-cylinder internal combustion engine having an ignition coil, comprising:

means for picking up ignition pulses from said ignition coil;

pulse shaping means connected to said ignition pulse pickup means for producing a first control pulse therefrom upon each occurrence of an ignition pulse;

means responsive to the first control pulse for providing a second control pulse which is delayed from the occurrence of the first control pulse by an amount which is directly proportional to the interval between successive ones of the ignition pulses;

means connected to the first cylinder of said multiple-cylinder engine for producing a third control pulse whenever the first cylinder fires;

a multistage ring pulse counter having stages equal in number to the number of cylinders in said engine;

reset means responsive to the third control pulse to place all of the stages of the pulse counter in a reset condition;

means for incrementally advancing the counter in the ring pulse counter with the occurrence of each of the second control pulses; and utilization means connected to the output of the stages of the ring pulse counter and responsive to the pulse count therein.

32. The combination as defined in claim 31 wherein the means for providing the second control pulse comprises:

means for generating a sawtooth waveform in response to the occurrence of the first control pulse, which sawtooth waveform has an amplitude independent of the repetition rate of the ignition pulses; and an amplitude level detector connected to the output of the sawtooth waveform generating means and responsive to a preset amplitude level of said waveform to generate the second control pulse.

33. The combination as defined in claim 32 including:

a cathode ray oscilloscope having horizontal and vertical inputs, means responsive to the second control pulse for generating a sawtooth sweep signal, means for coupling the sawtooth sweep signal to the horizontal input of the oscilloscope, and means connecting the means for picking up the ignition pulses to the vertical input of the oscilloscope.

34. The combination as defined in claim 33 including:

a current summing network connected to the stages of the ring pulse counter for generating a staircase waveform therefrom; and means connecting the network to the vertical input of the oscilloscope whereby the displayed waveforms may be vertically separated.

35. The combination as defined in claim 34 including:

pattern select switch means interposed between the second control pulse providing means, the third control pulse producing means and the sweep signal generating means for synchronizing the sweep signal with the occurrence of each second control pulse or the occurrence of each second and third control pulses.

36. The combination as defined in claim 35 wherein the utilization means includes means connected to the ring pulse counter and to the ignition coil for repressing the ignition of a selected one of the cylinders of the engine in accordance with a given count in the ring pulse counter.

37. The combination as defined in claim 31 including:

a strobe lamp connected to the second control pulse providing means and to the third control pulse producing means, and responsive to the simultaneous occurrence of said second and third control pulses to generate a visible flash of light which may be used to monitor the ignition advance setting of said engine.

38. The combination as defined in claim 31 wherein the pulse shaping means includes an input terminal, an output terminal and a ground and a pair of gates connected between the input and output terminals thereof for providing the first control pulse of one polarity between the output terminal and ground in response to the application of a positive or negative input pulse between the input terminal and ground.

*39. In an apparatus for analyzing the operation of a multiple cylinder internal combustion engine having an ignition time interval for each cylinder during which ignition normally occurs, the combination which comprises:*

*means coupled to the engine for generating a first control pulse in response to the ignition time interval for each of the cylinders, the first control pulse having a short time duration which is independent of the rotational velocity of the engine,*

*means responsive to each first control pulse for providing a second control pulse which is delayed from the presense of the first control pulse by an amount which is directly proportional to the interval between the successive times of cylinder ignition,*

*means responsive to each occurrence of the second control pulse for generating anticipatory ignition suppression signals in advance of the ignition times in respective cylinders, and*

*means coupled to the engine and responsive to the ignition suppression signals for suppressing the ignition in a selected cylinder.*

*40. The combination as defined in claim 39 wherein the means for providing the second control pulse includes a sweep generator for generating a ramp voltage in response to each first control pulse.*

*41. The combination as defined in claim 40 wherein the means for providing the second control pulse further includes means for generating a reference signal and means for comparing the ramp voltage with the reference signal.*

*42. The combination as defined in claim 41 wherein the means for providing the second control pulse further includes servo control means for adjusting one of the ramp voltage and the reference signal in response to the time period between the preceding cylinder ignitions.*

*43. The combination as defined in claim 39 wherein the means for providing the second control pulse includes means for adjusting the amount of the time delay between the first and second control pulses.*

*44. Apparatus for analyzing the functioning of a multiple-cylinder internal combustion engine having an ignition coil, comprising:*

*means for picking up ignition pulses from said ignition coil:*

*pulse shaping means connected to said ignition pulse pickup means for producing a first control pulse therefrom upon each occurrence of an ignition pulse, the 1st control pulse having a short time duration which is independent of the frequency of the ignition pulse;*

*means responsive to the first control pulse for providing a second control pulse which is delayed from the occurrence of the first control pulse by an amount which is directly proportional to the interval between successive ones of the ignition pulses;*

*means connected to the first cylinder of said multiple-cylinder engine for producing a third control pulse whenever the first cylinder fires;*

*a multistage ring pulse counter having stages equal in number to the number of cylinders in said engine;*

*reset means responsive to the third control pulse to place all of the stages of the pulse counter in a reset condition;*

*means for incrementally advancing the counter in the ring pulse counter with the occurrence of each of the second control pulses; and*

*utilization means connected to the output of the stages of the ring pulse counter and responsive to the pulse count therein.*

*45. The combination as defined in claim 44 wherein the means for providing the second control pulse is a servo controlled timing circuit which is responsive to the time delay between preceeding ignition pulses for causing the second control pulse to occur a predetermined number of degrees of engine rotation in advance of the next ignition pulse.*

*46. In an apparatus for analyzing the operation of a multiple cylinder internal combustion engine having an ignition time interval for each cylinder during which ignition normally occurs and an ignition system for generating an ignition pulse to initiate the ignition in each cylinder, the combination which comprises:*

*means adapted to be coupled to the engine ignition system for generating a first control pulse in response to each ignition pulse, the first control pulse having a short time duration which is independent of the rotational velocity of the engine,*

*a timing circuit responsive to each first control pulse for producing a second control pulse which is delayed in time from the completion of each first control pulse by an amount which is inversely proportional to the frequency of the ignition pulses,*

*means responsive to the second control pulses from the timing circuit for generating anticipatory ignition suppression signals in advance of the ignition times in respective cylinders, and*

*means coupled to the engine and responsive to the ignition suppression signals for suppressing the ignition in a selected cylinder.*

*47. The combination as defined in claim 46 wherein the timing circuit includes means for generating a ramp voltage, means for providing a reference signal and means for comparing the instantaneous amplitude of the ramp voltage and reference signals to provide the second control pulse when said instantaneous amplitudes are equal.*

*48. The combination as defined in claim 47 wherein the reference signal is fixed in amplitude during the engine operation.*

* * * * *